United States Patent
Lee et al.

(10) Patent No.: US 12,358,746 B2
(45) Date of Patent: Jul. 15, 2025

(54) AUTOMATIC ELECTRODE SUPPLY APPARATUS FOR MANUFACTURE OF SECONDARY BATTERY AND AUTOMATIC ELECTRODE SUPPLY METHOD USING THE SAME

(71) Applicant: LG ENERGY SOLUTION, LTD., Seoul (KR)

(72) Inventors: Young Soo Lee, Daejeon (KR); Jin Soo Lee, Daejeon (KR); Seung Bae Lee, Daejeon (KR); Hong Ju Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 472 days.

(21) Appl. No.: 17/765,587

(22) PCT Filed: Oct. 8, 2020

(86) PCT No.: PCT/KR2020/013743
§ 371 (c)(1),
(2) Date: Mar. 31, 2022

(87) PCT Pub. No.: WO2021/096068
PCT Pub. Date: May 20, 2021

(65) Prior Publication Data
US 2022/0363505 A1    Nov. 17, 2022

(30) Foreign Application Priority Data

Nov. 13, 2019   (KR) .......................... 10-2019-0145198

(51) Int. Cl.
*B65H 21/00*     (2006.01)
*H01M 10/04*     (2006.01)

(52) U.S. Cl.
CPC ........ *B65H 21/00* (2013.01); *H01M 10/0404* (2013.01); *B65H 2301/460186* (2013.01);
(Continued)

(58) Field of Classification Search
CPC .......................... B65H 21/00; H01M 10/0404
(Continued)

(56) References Cited

U.S. PATENT DOCUMENTS

2002/0189746 A1   12/2002   Kuta et al.
2004/0173072 A1    9/2004   Ishii et al.
2021/0234145 A1*   7/2021   Chung .................... B26D 9/00

FOREIGN PATENT DOCUMENTS

JP         9-63577 A     3/1997
JP       10-279149 A    10/1998
(Continued)

OTHER PUBLICATIONS

Chung, Y., "English machine-translation by Clarivate Analytics of KR101819729B1, H01M4/139, Mar. 2, 2018. Full KR patent application is included. (Year: 2018)".*

(Continued)

*Primary Examiner* — Abbas Rashid
*Assistant Examiner* — Gregory C. Grosso
(74) *Attorney, Agent, or Firm* — Birch, Stewart, Kolasch & Birch, LLP (57) ABSTRACT

An automatic electrode supply apparatus configured to automatically supply an electrode in various processes for manufacturing a secondary battery includes a first chuck splicing unit including a splicing portion having a traveling electrode located thereon and a second chuck splicing unit including a splicing portion having a standby electrode located thereon, wherein each of the first and second chuck splicing units includes an edge position control (EPC) sensor configured to measure the position of the edge of a correspond- (Continued)

ing one of the traveling electrode and the standby electrode in order to prevent distortion or fracture defect of the electrode due to positional deviation between the traveling electrode and the standby electrode, and an automatic electrode supply method using the same.

11 Claims, 4 Drawing Sheets

(52) U.S. Cl.
CPC .............. *B65H 2301/46172* (2013.01); *B65H 2301/4621* (2013.01); *B65H 2701/19* (2013.01)

(58) Field of Classification Search
USPC ......................................................... 156/159
See application file for complete search history.

(56) References Cited

FOREIGN PATENT DOCUMENTS

| | | | |
|---|---|---|---|
| JP | 2003-22819 | A | 1/2003 |
| JP | 2005-66858 | A | 3/2005 |
| JP | 2013-4393 | A | 1/2013 |
| JP | 2017-117685 | A | 6/2017 |
| KR | 10-2012-0069901 | A | 6/2012 |
| KR | 10-2013-0105001 | A | 9/2013 |
| KR | 10-1479724 | B1 | 1/2015 |
| KR | 10-2015-0049474 | A | 5/2015 |
| KR | 10-2016-0133264 | A | 11/2016 |
| KR | 10-2017-0111692 | A | 10/2017 |
| KR | 10-1818729 | B1 | 3/2018 |
| KR | 10-1857396 | B1 | 5/2018 |
| KR | 10-2043024 | B1 | 11/2019 |

OTHER PUBLICATIONS

Kang, J. et al., English machine-translation by Calrivate Analytics of KR-20160133264-A, H01M10/058, Nov. 22, 2016. Full KR patent application is icluded. (See the NPL filed on May 31, 2024). (Year: 2016).*

International Search Repori (PCT/ISA/210) issued in PCT/KR2020/013743 mailed on Jan. 27, 2021.

Extended European Search Report for European Application No. 20886922.2, dated Jul. 1, 2024.

* cited by examiner

AUTOMATIC ELECTRODE SUPPLY APPARATUS FOR MANUFACTURE OF SECONDARY BATTERY AND AUTOMATIC ELECTRODE SUPPLY METHOD USING THE SAME

TECHNICAL FIELD

This application claims the benefit of priority to Korean Patent Application No. 2019-0145198 filed on Nov. 13, 2019, the disclosure of which incorporated herein by reference in its entirety.

The present invention relates to an apparatus for automatically supplying an electrode in various processes for manufacturing a secondary battery and an automatic electrode supply method, and more particularly to an apparatus capable of successively supplying an electrode, the apparatus including a plurality of chuck splicing units each configured to supply an electrode, and an automatic electrode supply method using the same.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

Such a secondary battery includes an electrode assembly in which electrodes and separators are alternately stacked and a case configured to receive the electrode assembly. The electrode assembly, which is a power-generating element configured to have a structure in which a positive electrode and a negative electrode are stacked in the state in which a separator interposed between the positive electrode and the negative electrode, is classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, or a stacked type electrode assembly, which is configured to have a structure in which a plurality of positive electrodes having a predetermined size and a plurality of negative electrodes having a redetermined size are sequentially stacked in the state in which separators are interposed respectively between the positive electrodes and the negative electrodes.

A stacked/folded type electrode assembly, which is configured to have a structure in which mono-cells, each of which has a positive electrode/separator/negative electrode structure of a predetermined unit size, or bicells, each of which has a positive electrode (negative electrode)/separator/negative electrode (positive electrode)/separator/positive electrode (negative electrode) structure, are folded using a continuous separation film having a long length, has been developed as an electrode assembly having an improved structure, which is a combination of the jelly-roll type electrode assembly and the stacked type electrode assembly.

In addition, a laminated/stacked type electrode assembly, which is configured to have a structure in which unit cells, in each of which electrodes and separators are alternately stacked and laminated, are stacked in order to improve processability of a conventional stacked type electrode assembly and to satisfy the demand for secondary batteries having various shapes, has also been developed.

A positive electrode used for such an electrode assembly is manufactured by applying a mixture of a positive electrode active material, a conductive agent, and a binder to a positive electrode current collector, such as metal foil, and drying the mixture. A filler may be further added as needed.

In addition, a negative electrode is manufactured by applying a negative electrode material to a negative electrode current collector, such as metal foil, and drying the negative electrode material. Ingredients described above in connection with the positive electrode may be further optionally included as needed.

There is an increasing necessity for an apparatus capable of stably and successively supplying an electrode in an electrode and electrode assembly manufacturing process in order to improve productivity of a secondary battery manufacturing process and to reduce a process defect rate.

Korean Registered Patent Publication No. 1479724 discloses a secondary battery electrode production system including a plurality of electrode reels configured to store an electrode material in a wound state in order to successively supply the electrode material, an unwinding portion configured to successively supply the electrode material from the plurality of electrode reels, a line position control (LPC) sensor or an edge position control (EPC) sensor, and a meandering adjustment means configured to align the position of the electrode material such that the electrode material moves along a predetermined movement path. However, the above patent publication relates only to a system capable of producing an electrode from an electrode material at high speed and does not disclose an apparatus capable of successively supplying an electrode in various processes for production of a secondary battery. Accordingly, there is an urgent need to develop technology therefor.

PRIOR ART DOCUMENT (Patent Document 1) Korean Registered Patent Publication No, 1479724

DISCLOSURE

Technical Problem

The present invention has been made in view of the above problems, and it is an object of the present invention to provide an apparatus for automatically supplying an electrode in succession in various processes for manufacturing a secondary battery and an automatic electrode supply method.

It is another object of the present invention to provide an automatic electrode supply apparatus and an automatic electrode supply method capable of preventing distortion or fracture defect of an electrode due to positional deviation between a traveling electrode and a standby electrode in the above processes.

Technical Solution

In order to accomplish the above object, the present invention provides an automatic electrode supply apparatus including a first chuck splicing unit including a splicing portion having a traveling electrode located thereon and a second chuck splicing unit including a splicing portion having a standby electrode located thereon, wherein each of the first and second chuck splicing units includes an edge position control (EPC) sensor configured to measure a position of an edge of a corresponding one the traveling electrode and the standby electrode.

Also, in the automatic electrode supply apparatus according to the present invention, each splicing portion may include a splicing plate and an electrode cutter and each splicing portion may be movable in a direction parallel to a floor surface.

Also, in the automatic electrode supply apparatus according to the present invention, each splicing plate may include an upper plate and a lower plate, each of the upper plate and the lower plate having a suction hole, configured to suction the corresponding one of traveling electrode and the standby electrode in order to fix the corresponding one of traveling electrode and the standby electrode, formed in the surface thereof contacting the corresponding one of traveling electrode and the standby electrode, and an incision recess provided between the upper plate and the lower plate, the incision recess being configured to allow the electrode cutter to be moved therein.

Also, in the automatic electrode supply apparatus according to the present invention, each of the first and second chuck splicing units may further include a lower support member configured to support the chuck splicing unit, an upper support member located above the lower support member, the upper support member being configured to support the splicing portion, and a rotary shaft located between the lower support member and the upper support member, the rotary shaft being configured to rotate the upper support member.

Also, in the automatic electrode supply apparatus according to the present invention, each upper support member may include a horizontal portion and a vertical portion.

Also, in the automatic electrode supply apparatus according to the present invention, each of the first and second chuck splicing units may further include a splicing portion support member located on the vertical portion of the upper support member, the splicing portion support member being configured to support the splicing portion.

Also, in the automatic electrode supply apparatus according to the present invention, each EPC sensor may be fixed to the vertical portion of the upper support member or to the splicing portion support member of the corresponding first and second chuck splicing units.

In addition, the present invention provides an automatic electrode supply method including (i) preparing a traveling electrode on a splicing plate of a first chuck splicing unit, (ii) preparing a standby electrode on a splicing plate of a second chuck splicing unit, (iii) rotating the second chuck splicing unit to move the splicing plate of the second chuck splicing unit having the standby electrode prepared thereon so as to face the splicing plate of the first chuck splicing unit having the traveling electrode prepared thereon, (iv) measuring the position of an edge of the standby electrode using an EPC sensor of the second chuck splicing unit, (v) calculating positional deviation between the edge of the traveling electrode and the edge of the standby electrode, (vi) moving the splicing plate of the second chuck splicing unit having the standby electrode prepared thereon to correct the positional deviation, and (vii) laminating the splicing plate of the second chuck splicing unit having the standby electrode prepared thereon and the splicing plate of the first chuck splicing unit having the traveling electrode prepared thereon with each other to connect the traveling electrode and the standby electrode to each other.

Also, in the automatic electrode supply method according to the present invention, step (i) may include allowing the splicing plate of the first chuck splicing unit to suction the traveling electrode and cutting a portion of the suctioned traveling electrode under an upper plate of the splicing plate of the first chuck splicing unit using the electrode cutter of the first chuck splicing unit.

Also, in the automatic electrode supply method according to the present invention, step (ii) may include attaching a connection tape to one surface of an end of the standby electrode and allowing the standby electrode having the connection tape attached thereto to be suctioned to a lower plate of the splicing plate of the second chuck splicing unit.

Also, the automatic electrode supply method according to the present invention may further include (viii) separating the connected electrodes from the splicing plates of the first and second chuck splicing units after step (vii).

Advantages Effects

An automatic electrode supply apparatus and an automatic electrode supply method according to the present invention have an advantage in that a plurality of chuck splicing units having the same function and structure is used to successively supply an electrode, whereby it is possible to successively supply an electrode while minimizing loss in production time in various processes for manufacturing a secondary battery.

In addition, the automatic electrode supply apparatus and the automatic electrode supply method according to the present invention have an advantage in that an EPC sensor is used to measure positional deviation and the measured positional deviation corrected, whereby it is possible to prevent distortion or fracture defect of an electrode due to positional deviation between a traveling electrode and a standby electrode, which may occur when the electrode is successively supplied.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings refer to parts that perform similar functions or operations. In the case in which one part is said connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an automatic electrode supply apparatus and an automatic electrode supply method according to the present invention will be described with reference to the accompanying drawings.

Figure 1:
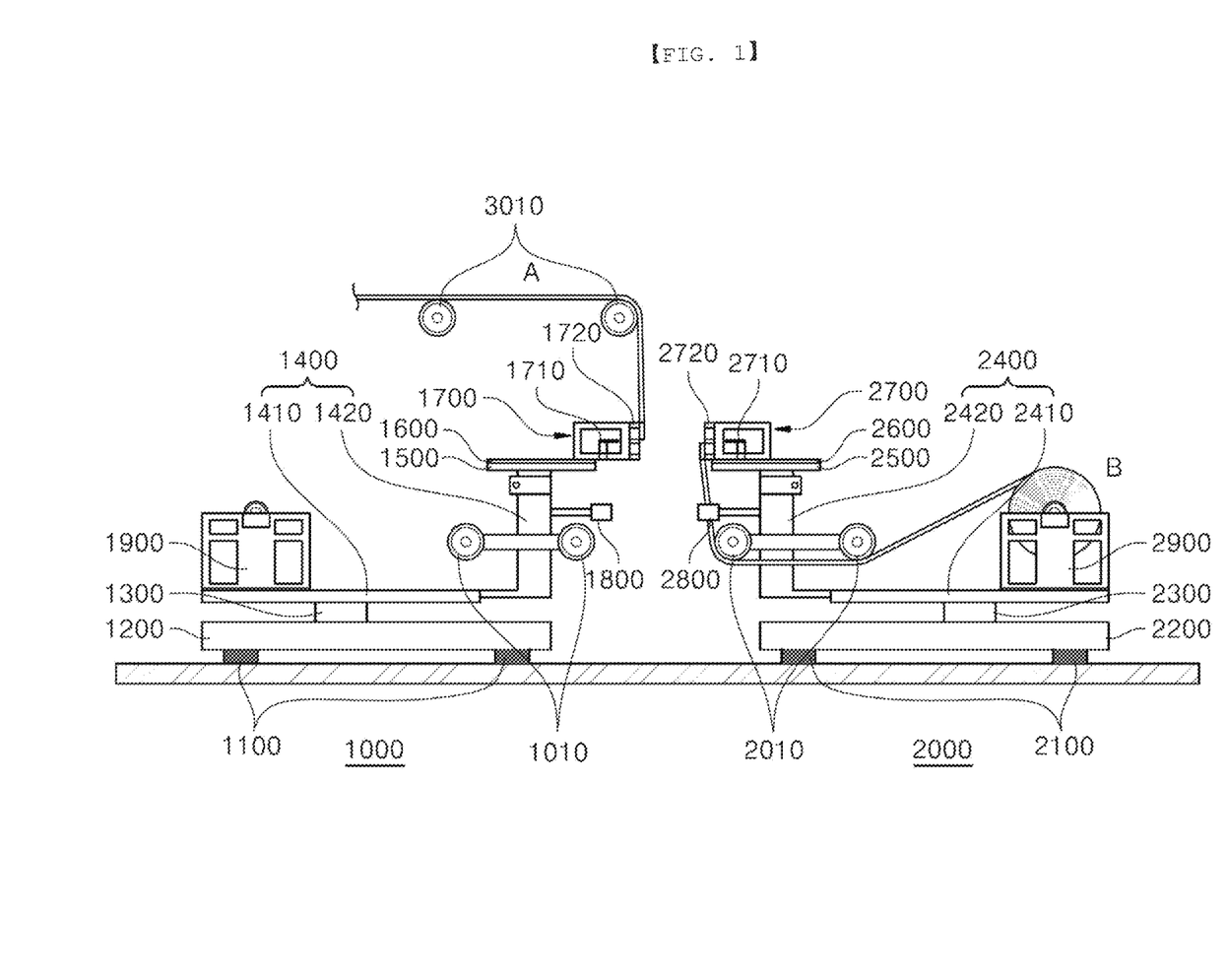
FIG. 1 is a schematic view of an automatic electrode supply apparatus according to a first preferred embodiment of the present invention.

FIG. 1 is a schematic view of an automatic electrode supply apparatus according to a first preferred embodiment of the present invention.

Referring to FIG. 1, the automatic electrode supply apparatus according to the first preferred embodiment of the present invention includes a first chuck splicing unit 1000, at which a traveling electrode A is located, and a second chuck splicing unit 2000, at which a standby electrode B is located.

The first chuck splicing unit 1000 includes a lower driving means 1100 disposed abutting a floor surface, the lower driving means being configured to support the first chuck splicing unit 1000, a lower support member 1200 located on the lower driving means 1100, an upper support member 1400 located above the lower support member 1200, and a rotary shaft 1300 located between the lower support member 1200 and the upper support member 1400, the rotary shaft being configured to rotate the upper support member 1400.

In addition, the first chuck splicing unit 1000 includes a splicing portion support member 1500 located on the upper support member 1400, a splicing portion driving means 1600 located on the splicing portion support member 1500, the splicing portion driving means being configured to drive a splicing portion 1700, the splicing portion 1700 being located on the splicing portion driving means 1600, the splicing portion 1700 being configured to suction an electrode, an edge position control (EPC) sensor 1800, and a winding roll holder 1900 located on the upper support member 1400, the winding roll holder being configured to hold an electrode winding roll.

Respective components of the first chuck splicing unit 1000 will be described in detail. First, the lower driving means 1100 may be realized by an assembly of a linear motion (LM) guide and a servomotor such that the first chuck splicing unit 1000 can be rectilinearly moved in one direction. However, the present invention is not limited thereto. Any of various known devices capable of performing rectilinear reciprocation may be used.

In addition, the upper support member 1400 includes a horizontal portion 1410 and a vertical portion 1420. The winding roll holder 1900 is located on the horizontal portion 1410, and a guide roller 1010 configured to transfer a roll type electrode is fixed to the vertical portion.

The splicing portion driving means 1600 may be realized by an assembly of an LM guide, a rack and pinion, and a driving means, such as a servomotor or an actuator, such that the splicing portion 1700 can be rectilinearly reciprocated on the splicing portion support member 1500. However, the present invention is not limited thereto. Any of various known devices capable of performing rectilinear reciprocation may be used.

In addition, the splicing portion 1700 includes an electrode cutter 1710 configured to cut an electrode and a splicing plate 1720 configured to suction the electrode.

Figure 2:
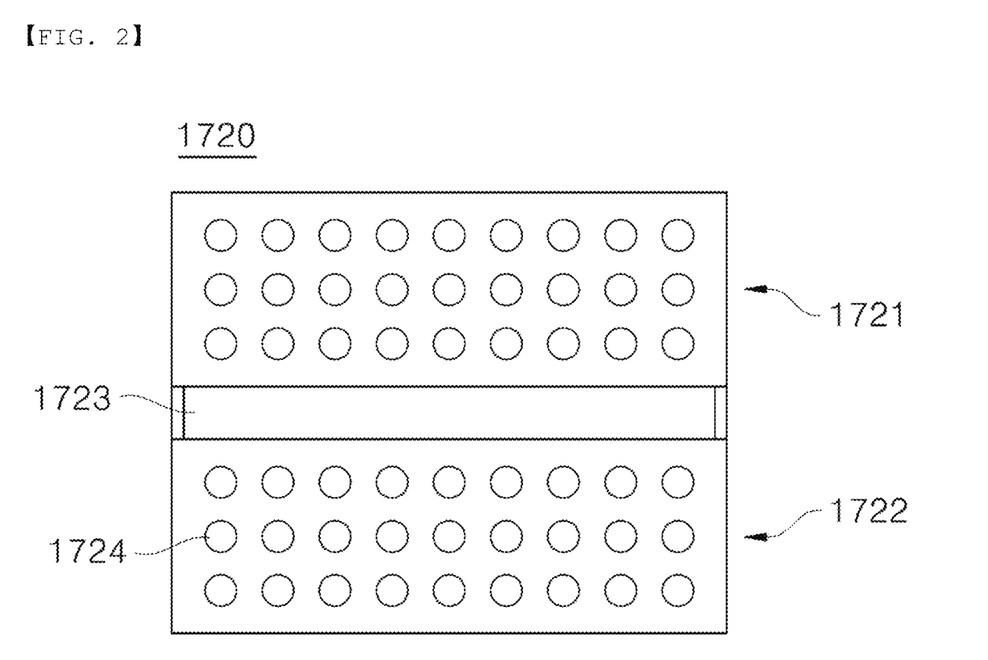
FIG. 2 is a schematic view of a splicing plate of the present invention.

FIG. 2 is a schematic view of a splicing plate 1720 according to a first preferred embodiment of the present invention.

The splicing plate 1720 will be described in detail with reference to FIG. 2. The splicing plate 1720 includes an upper plate 1721, a lower plate 1722, an incision recess 1723 provided between the upper plate 1721 and the lower plate 1722, the incision recess being configured to allow the electrode cutter 1710, which is configured to cut an electrode, to be moved therein, and suction holes 1724 formed in the upper plate and the lower plate.

Next, the EPC sensor 1800, which is a sensor configured to measure the position of the edge of an electrode in order to determine the extent to which the position of the electrode deviates, may be fixed to the vertical portion 1420 of the upper support member or to the splicing portion support member 1500. However, the present invention is not limited thereto. The EPC sensor may measure the position of the edge of an electrode, and may be located at another portion of the chuck splicing unit within a range within which the operation of other devices is not disturbed.

In addition, the EPC sensor includes: a detector configured to measure a position;
an amplifier configured to amplify a detected signal; and
a controller configured to calculate positional deviation from a measured value and to control the device in order to correct the position based thereon.

Any of various kinds of already known EPC sensors may be used.

The second chuck splicing unit 2000 is a device having the same structure and function as the first chuck splicing unit 1000. Consequently, the description of the first chuck splicing unit 1000 can be referred to and a detailed description of respective components of the second chuck splicing unit will be omitted.

Figure 3:
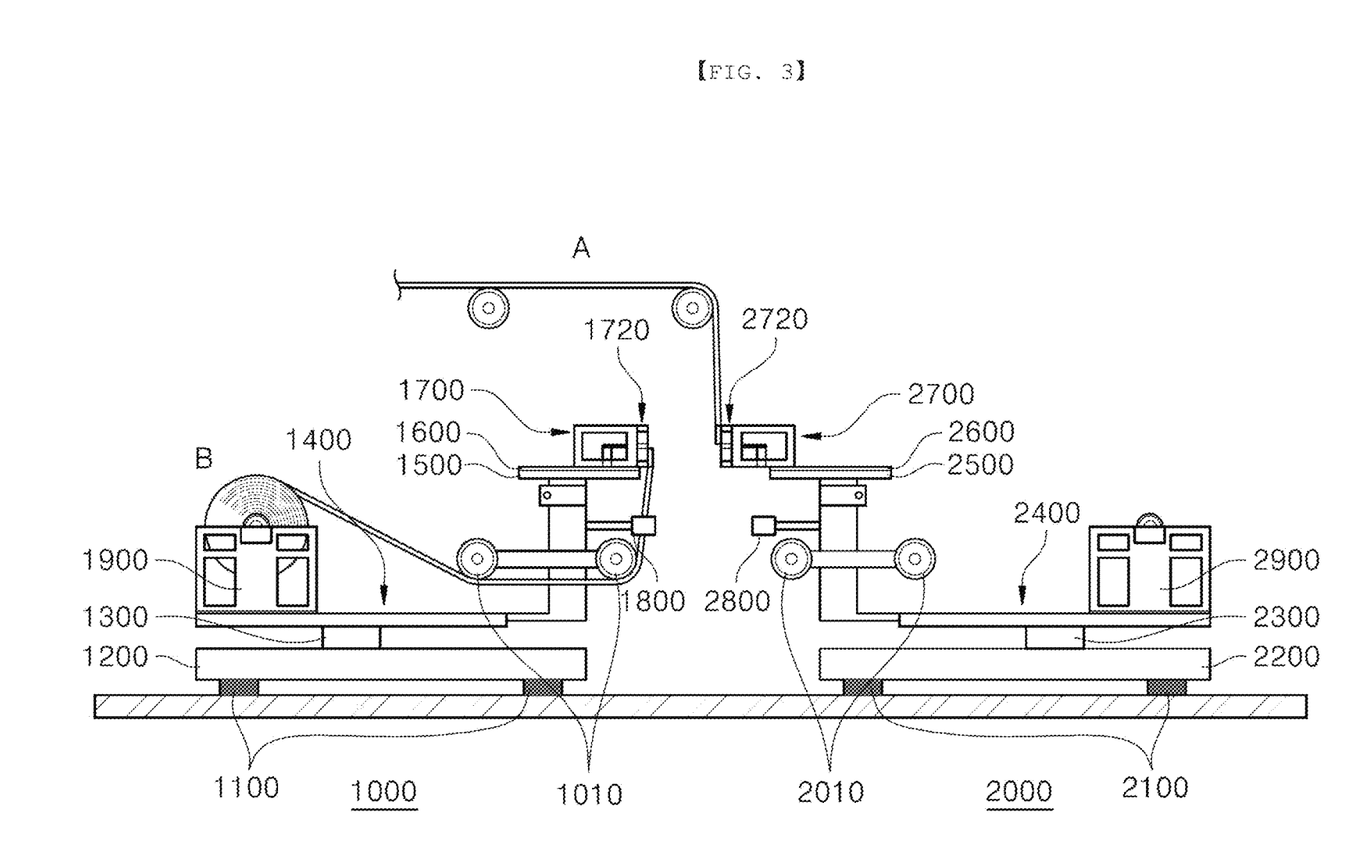
FIG. 3 is a schematic view of an automatic electrode supply apparatus according to a second preferred embodiment of the present invention.

FIG. 3 is a schematic view of an automatic electrode supply apparatus according to a second preferred embodiment of the present invention.

Referring to FIG. 3, FIG. 3 is identical to FIG. 1 except that the standby electrode B is located at the first chuck splicing unit 1000 and the traveling electrode A is located at the second chuck splicing unit 2000.

That is, in this construction, the first chuck splicing unit 1000 and the second chuck splicing unit. 2000, which have the same structure, are alternately used to successively supply an electrode to a manufacturing process, and loss in time necessary to introduce the standby electrode is minimized.

The automatic electrode supply apparatus according to the embodiment of the present invention has been described above. Hereinafter, a method of automatically supplying an electrode using the automatic electrode supply apparatus will be described.

An automatic electrode supply method according to an embodiment of the present invention includes (i) a step of preparing a traveling electrode A on the splicing plate 1720 of the first chuck splicing unit 1000, (ii) a step of preparing a standby electrode B on the splicing plate 2720 of the second chuck splicing unit 2000, (iii) a step of rotating the second chuck splicing unit to move the splicing plate 2720, on which the standby electrode is prepared, to a position at which the splicing plate 2720 faces the splicing plate 1720, on which the traveling electrode is prepared, (iv) a step of measuring the position of the edge of the standby electrode using the EPC sensor 2800, (v) a step of calculating positional deviation between the edges of the traveling electrode and the standby electrode, (vi) a step of moving the splicing plate having the standby electrode prepared thereon to correct the positional deviation, (vii) a step of laminating the plate having the standby electrode suctioned thereto and the plate having the traveling electrode suctioned thereto with each other to connect the traveling electrode and the standby electrode to each other, and (viii) a step of separating the connected electrodes from the splicing plates.

Respective steps will be described in detail with reference to FIGS. 1, 3, and 4. First, step (i) includes a step of moving the splicing plate 1720 of the first chuck splicing unit 1000 in a direction toward the traveling electrode A and allowing the plate to suction the traveling electrode A using the suction holes formed in one surface of the plate and a step of cutting the portion of the traveling electrode under the upper plate 1721 through the incision recess 1723 using the electrode cutter 1710 in order to connect the standby electrode B to the traveling electrode A suctioned by the plate, as shown in (a)-(c) of FIG. 4.

Figure 4:
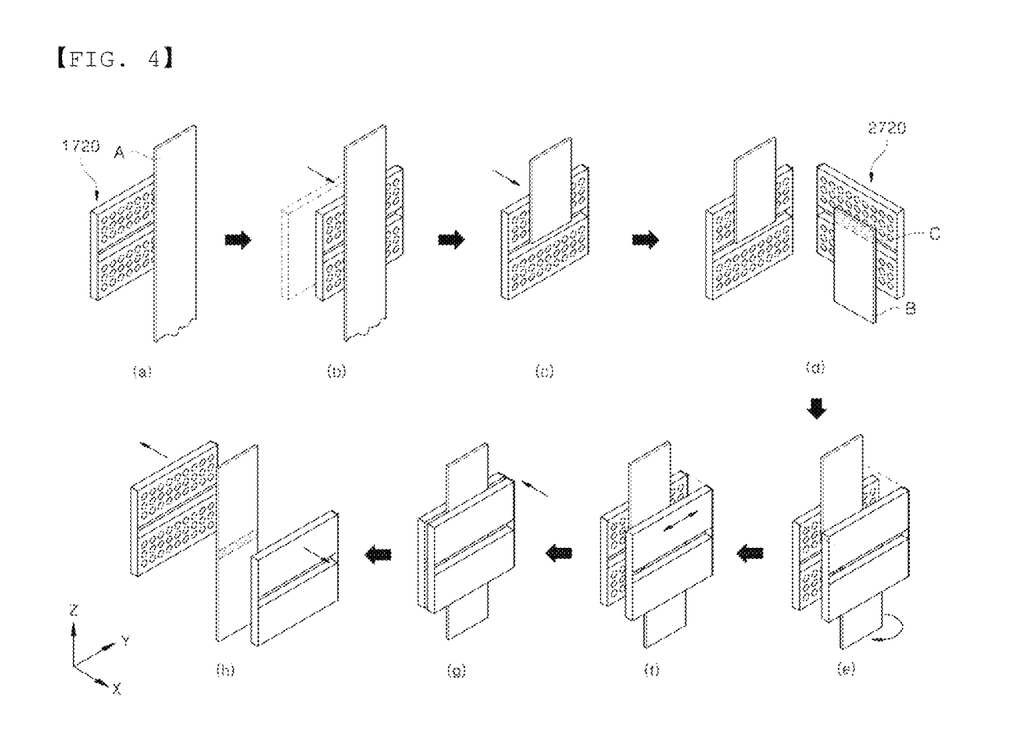
FIG. 4 is a schematic view showing a method of automatically supplying an electrode using the automatic electrode supply apparatus according to the present invention.

Next, referring to (d) of FIG. 4, step (ii) includes a step of attaching a connection tape C to one surface of the end of the standby electrode B so as to be connected to the traveling electrode and a step of allowing the standby electrode having the connection tape attached thereto to be suctioned to the lower part of the splicing plate 2720 of the second chuck splicing unit 2000.

Also, in step (v), i.e. the step of calculating positional deviation, the positional deviation is calculated based on the value of the position of the edge of the standby electrode measured in step (iv) and the value of the position or the edge of the traveling electrode. Here, the traveling electrode is an electrode that has already been introduced into the process before step (i). The value of the position of the edge of the traveling electrode is frequently measured before introduction into the process and during the process in order to prevent meandering of the traveling electrode. The value of the position of the edge of the traveling electrode may not be additionally measured while the automatic electrode supply method according to the present invention is performed.

Meanwhile, not only the EPC sensor described above but also any one selected from among all measurement devices capable of measuring the position of an edge, such as various kinds of known sensors and cameras, may be used as the device configured to measure the position of each of the traveling electrode and the standby electrode.

Next, referring to (e)-(g) of FIG. 4, in step (vi), the splicing plate 2720 having the standby electrode suctioned thereto is finely moved in a predetermined direction (a direction that is perpendicular to the direction in which the splicing plate is moved in order to suction the traveling electrode and the plates are moved in order to laminate the traveling electrode and the standby electrode with each other and that is parallel to the ground, i.e. a Y-axis direction in FIG. 4), in order to correct the positional deviation.

Finally, referring to (h) of FIG. 4, after step (viii), the connected electrodes are introduced into the manufacturing process using a transfer roller 3010, whereby production is continuously performed. Referring to FIG. 3. The standby electrode is prepared in the first chuck splicing unit 1000, in which the traveling electrode was located conventionally, such that the standby electrode is connected to the traveling electrode according to steps (i) to (viii) described above after the traveling electrode prepared in the second chuck splicing unit 2000 is consumed, whereby it is possible to minimize loss in time incurred for electrode replacement.

Meanwhile, a method of using the lower driving means 1100 or 2100 to drive the entirety of the chuck splicing unit, a method of providing a separate driving means (not shown) on the splicing portion support member 1500 or 2500 to drive only the splicing portion 1700 or 2700, or a method of providing a separate driving means (not shown) between the splicing portion support member 1500 or 2500 and the vertical portion 1420 or 2420 of the upper support member to simultaneously drive the splicing portion support member 1500 or 2500 and the splicing portion 1700 or 2700 may be used as a method of moving the splicing plate 1720 or 2720 in the predetermined direction (the Y-axis direction) in order to correct the positional deviation. Here, any of various known driving means capable of performing rectilinear reciprocation may be used as the driving means described above.

Also, it is preferable that position correction be performed to the extent to which it is possible to minimize distortion or fracture defect of the electrode due to the positional deviation between the traveling electrode and the standby electrode.

Specifically, Table 1 below shows a change in the number of defects depending on the positional deviation between the traveling electrode and the standby electrode in the process of connecting the standby electrode using the automatic electrode supply apparatus after the traveling electrode wound on the traveling electrode winding roll is consumed.

TABLE 1

| Positional deviation (mm) | 0.5 | 1.0 | 1.5 | 2.0 | 2.5 | 3.0 | 5.0 |
|---|---|---|---|---|---|---|---|
| Number of defects | 4 | 10 | 12 | 10 | 11 | 35 | 37 |

As shown in Table 1 above, it is preferable that the positional deviation (the path line deviation) be corrected to 2.5 mm less in order to prevent distortion or fracture defect of the electrode due to the positional deviation between the traveling electrode and the standby electrode. More preferably, it can be seen that a very small number of defects due to the positional deviation occurs in the case in which the positional deviation is corrected to less than 1 mm.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

1000: First chuck splicing unit
2000: Second chuck splicing unit.
1010, 2010: Guide rollers
1100, 2100: Lower driving means
1200, 2200: Lower support members
1300, 2300: Rotary shafts
1400, 2400: Upper support members
1410, 2410: Horizontal portions of upper support members
1420, 2420: Vertical portions of upper support members
1500, 2500: Splicing portion support members
1600, 2600: Splicing portion driving means
1700, 2700: Splicing portions
1710, 2710: Electrode cutters
1720, 2720: Splicing plates
1721, 2721: Upper plates
1722, 2722: Lower plates 1723, 2723: Incision recesses
1724, 2724: Suction holes
1800, 2800: EPC sensors
1900, 2900: Winding roll holders
3010: Transfer roller
A: Traveling electrode
B: Standby electrode
C: Connection tape

The invention claimed is:

1. An automatic electrode supply apparatus configured to automatically supply an electrode in various processes for manufacturing a secondary battery, the automatic electrode supply apparatus comprising:
   a first chuck splicing unit comprising a splicing portion having a traveling electrode located thereon; and
   a second chuck splicing unit comprising a splicing portion having a standby electrode located thereon,
   wherein each of the first and second chuck splicing units comprises an edge position control (EPC) sensor configured to measure a position of a lateral edge of a corresponding one of the traveling electrode and the standby electrode, the lateral edge extending in a traveling direction of the traveling electrode.

2. The automatic electrode supply apparatus according to claim 1, wherein each splicing portion comprises a splicing plate and an electrode cutter, and
   wherein each splicing portion is movable in a direction parallel to a floor surface to laterally adjust the lateral edge of the corresponding one of the traveling electrode and the standby electrode.

3. The automatic electrode supply apparatus according to claim 2, wherein each splicing plate comprises:
   an upper plate and a lower plate, each of the upper plate and the lower plate having a suction hole, configured to suction the corresponding one of the traveling electrode and the standby electrode in order to fix the corresponding one of the traveling electrode and the standby electrode, formed in a surface thereof contacting the corresponding one of the traveling electrode and the standby electrode; and
   an incision recess provided between the upper plate and the lower plate, the incision recess being configured to allow the electrode cutter to be moved therein.

4. An automatic electrode supply apparatus configured to automatically supply an electrode in various processes for manufacturing a secondary battery, the automatic electrode supply apparatus comprising:
   a first chuck splicing unit comprising a splicing portion having a traveling electrode located thereon; and
   a second chuck splicing unit comprising a splicing portion having a standby electrode located thereon,
   wherein each of the first and second chuck splicing units comprises an edge position control (EPC) sensor configured to measure a position of an edge of a corresponding one of the traveling electrode and the standby electrode, and
   wherein each of the first and second chuck splicing units further comprises:
   a lower support member configured to support the chuck splicing unit;
   an upper support member located above the lower support member, the upper support member being configured to support the splicing portion; and
   a rotary shaft located between the lower support member and the upper support member, the rotary shaft being configured to rotate the upper support member.

5. The automatic electrode supply apparatus according to claim 4, wherein each upper support member comprises a horizontal portion and a vertical portion.

6. The automatic electrode supply apparatus according to claim 5, wherein each of the first and second chuck splicing units further comprises a splicing portion support member located on the vertical portion of the upper support member, the splicing portion support member being configured to support the splicing portion.

7. The automatic electrode supply apparatus according to claim 6, wherein each EPC sensor is fixed to the vertical portion of the upper support member or to the splicing portion support member of the corresponding first and second chuck splicing units.

8. An automatic electrode supply method for automatically supplying an electrode using the automatic electrode supply apparatus according to claim 1, the automatic electrode supply method comprising:
   (i) preparing the traveling electrode on a splicing plate of the first chuck splicing unit;
   (ii) preparing the standby electrode on a splicing plate of the second chuck splicing unit;
   (iii) rotating the second chuck splicing unit to move the splicing plate of the second chuck splicing unit having the standby electrode prepared thereon so as to face the splicing plate of the first chuck splicing unit having the traveling electrode prepared thereon;
   (iv) measuring a position of an edge of the standby electrode using the EPC sensor of the second chuck splicing unit;
   (v) calculating positional deviation between an edge of the traveling electrode and the edge of the standby electrode;
   (vi) moving the splicing plate of the second chuck splicing unit having the standby electrode prepared thereon to correct the positional deviation; and
   (vii) laminating the splicing plate of the second chuck splicing unit having the standby electrode prepared thereon and the splicing plate of the first chuck splicing unit having the traveling electrode prepared thereon with each other to connect the traveling electrode and the standby electrode to each other.

9. The automatic electrode supply method according to claim 8, wherein step (i) comprises: allowing the splicing plate of the first chuck splicing unit to suction the traveling electrode; and cutting a portion of the suctioned traveling electrode under an upper plate of the splicing plate of the first chuck splicing unit using an electrode cutter of the first chuck splicing unit.

10. The automatic electrode supply method according to claim 8, wherein step (ii) comprises:
   attaching a connection tape to one surface of an end of the standby electrode; and
   allowing the standby electrode having the connection tape attached thereto to be suctioned to a lower plate of the splicing plate of the second chuck splicing unit.

11. The automatic electrode supply method according to claim 8, further comprising (viii) separating the connected traveling electrode and the standby electrode from the splicing plates of the first and second chuck splicing units after step (vii).

* * * * *